(12) United States Patent
Yamakaji et al.

(10) Patent No.: US 8,992,795 B2
(45) Date of Patent: Mar. 31, 2015

(54) METHOD FOR MANUFACTURING POSITIVE ELECTRODE ACTIVE MATERIAL FOR POWER STORAGE DEVICE

(75) Inventors: Masaki Yamakaji, Kanagawa (JP); Koji Nara, Kanagawa (JP); Mako Motoyoshi, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 228 days.

(21) Appl. No.: 13/273,262

(22) Filed: Oct. 14, 2011

(65) Prior Publication Data

US 2012/0091405 A1 Apr. 19, 2012

(30) Foreign Application Priority Data

Oct. 15, 2010 (JP) ................................ 2010-232203

(51) Int. Cl.
*H01M 4/88* (2006.01)
*H01M 4/04* (2006.01)
*C01B 33/20* (2006.01)
(Continued)

(52) U.S. Cl.
CPC ............. *H01M 4/0471* (2013.01); *C01B 33/20* (2013.01); *C01B 33/32* (2013.01); *H01M 4/366* (2013.01); *H01M 4/5825* (2013.01); *Y02T 10/7011* (2013.01); *H01M 4/136* (2013.01); *H01M 10/052* (2013.01)
USPC ...................... 252/182.1; 252/519.3; 428/403; 429/218.1; 429/231.9

(58) Field of Classification Search
USPC .......... 252/182.1, 519.3; 428/403; 429/231.1, 429/218.1
See application file for complete search history.

(56) References Cited

U.S. PATENT DOCUMENTS

| 6,085,015 A | 7/2000 | Armand et al. |
| 8,586,182 B2 | 11/2013 | Suzuki et al. |

(Continued)

FOREIGN PATENT DOCUMENTS

| CN | 101399336 A | 4/2009 |
| CN | 101499527 A | 8/2009 |

(Continued)

OTHER PUBLICATIONS

Nytén et al.,"The lithium extraction/insertion mechanism in Li2FeSiO4," J. Mater. Chem., 2006, 16 (23), 2266-2272.

(Continued)

*Primary Examiner* — Khanh Tuan Nguyen
(74) *Attorney, Agent, or Firm* — Nixon Peabody LLP; Jeffrey L. Costellia

(57) ABSTRACT

In a manufacturing process of a positive electrode active material for a power storage device, which includes a lithium silicate compound represented by a general formula $Li_2MSiO_4$, heat treatment is performed at a high temperature on a mixture material, grinding treatment is performed, a carbon-based material is added, and then heat treatment is performed again. Therefore, the reactivity between the substances contained in the mixture material is enhanced, favorable crystallinity can be obtained, and further microparticulation of the grain size of crystal which is grown larger by the high temperature treatment and crystallinity recovery are achieved; and at the same time, carbon can be supported on the surfaces of particles of the crystallized mixture material. Accordingly, a positive electrode active material for a power storage device, in which electron conductivity is improved, can be manufactured.

19 Claims, 6 Drawing Sheets

(51) Int. Cl.
*C01B 33/32* (2006.01)
*H01M 4/36* (2006.01)
*H01M 4/58* (2010.01)
*H01M 4/136* (2010.01)
*H01M 10/052* (2010.01)

(56) References Cited

U.S. PATENT DOCUMENTS

| | | | |
|---|---|---|---|
| 2008/0241693 A1* | 10/2008 | Fukuchi et al. | 429/231.1 |
| 2009/0087660 A1* | 4/2009 | Suzuki et al. | 428/403 |
| 2010/0104943 A1 | 4/2010 | Thomas et al. | |
| 2010/0140540 A1 | 6/2010 | Yamada et al. | |
| 2011/0008233 A1 | 1/2011 | Miyanaga et al. | |
| 2011/0065004 A1 | 3/2011 | Murakami et al. | |
| 2011/0291055 A1 | 12/2011 | Kojima et al. | |

FOREIGN PATENT DOCUMENTS

| | | | |
|---|---|---|---|
| CN | 101807690 A | 8/2010 | |
| EP | 2043183 A | 4/2009 | |
| JP | 2008-218303 | 9/2008 | |
| JP | 2008-277265 | * 11/2008 | H01M 4/48 |
| TW | 200840121 | 10/2008 | |

OTHER PUBLICATIONS

Sirisopanaporn et al., "Dependence of Li2FeSiO4 Electrochemistry on Structure," J. Am. Chem. Soc., 2011, 133 (5), 1263-1265.
Dominko et al., "In-situ XAS study on Li2MnSiO4 and Li2FeSiO4 cathode materials," Journal of Power Sources, 2009, 189 (1), 51-58.
Chinese Office Action (Application No. 201110321348.7) Dated Jul. 29, 2014.

* cited by examiner

METHOD FOR MANUFACTURING POSITIVE ELECTRODE ACTIVE MATERIAL FOR POWER STORAGE DEVICE

BACKGROUND OF THE INVENTION

1. Field of the Invention

The present invention relates to a method for manufacturing a positive electrode active material for a power storage device.

2. Description of the Related Art

Lithium-ion secondary batteries, which are small, lightweight, and reliable, have been widely used as power supplies of portable electronic devices. In addition, development of an electrically propelled vehicle on which a lithium-ion secondary battery is mounted has also progressed rapidly owing to growing awareness of environmental problems and energy problems.

As a positive electrode active material of a lithium-ion secondary battery, a phosphate compound having an olivine structure, such as $LiFePO_4$, $LiMnPO_4$, $LiCoPO_4$, or $LiNiPO_4$, has been known. However, the phosphate compound has a problem in that the charging capacity is limited and the operation voltage is high due to its structure. Thus, it is proposed to use a silicate-based (silicate) compound, such as $LiFeSiO_4$ or $LiMnSiO_4$ as a positive electrode active material due to the same olivine structure and high theoretical charging capacity.

As a synthesis method of a silicate-based (silicate) compound, such as $LiFeSiO_4$ or $LiMnSiO_4$, which can be used as a positive electrode active material of a lithium-ion secondary battery, a hydrothermal synthesis method and a solid phase reaction method have been known. In a hydrothermal synthesis method, microparticulation of a compound can be achieved, whereas in a solid phase reaction method, the mass production is possible and cost reduction can be achieved, which is preferable.

However, in the case of a solid phase reaction method, a mixture material in which materials of a positive electrode active material are mixed normally needs to be processed for a long time at a high temperature so that the reactivity is enhanced. As a result, the crystal grain size of the synthesized compound becomes large, which causes a significant problems for a positive electrode active material, such as a reduction in electron conductivity and a deterioration in capacitance characteristics, and therefore various researches have been made.

REFERENCE

[Patent Document 1] Japanese Published Patent Application No. 2008-218303

SUMMARY OF THE INVENTION

In view of the foregoing problems, it is an object of one embodiment of the disclosed invention to provide a method for manufacturing a silicate-based lithium compound which is a positive electrode active material for a power storage device by a solid phase reaction method which enables improvement of capacitance characteristics and electron conductivity.

One embodiment of the present invention is a method for manufacturing a positive electrode active material for a power storage device, in which heat treatment is performed at a high temperature on a mixture material in which materials of a positive electrode active material for a power storage device are mixed, grinding treatment is performed, a carbon-based material is added, and then heat treatment is performed again. Through the method, the reactivity between the substances contained in the mixture material is enhanced, favorable crystallinity can be obtained, and further microparticulation of the grain size of crystal which is grown larger by the high temperature heat treatment and crystallinity recovery are achieved; and at the same time, carbon can be supported on the surfaces of particles of the crystallized mixture material.

One embodiment of the present invention is a method for manufacturing a positive electrode active material for a power storage device, in which first heat treatment is performed on a mixture material in which a compound containing lithium, a compound containing a metal element selected from manganese, iron, cobalt, and nickel, and a compound containing silicon are mixed; grinding treatment is performed on the mixture material after the first heat treatment; a carbon-based material is added to the mixture material and mixing is performed; and second heat treatment is performed at a temperature lower than that of the first heat treatment.

Note that in the above structure, the first heat treatment is performed at a temperature of higher than or equal to 800° C. and lower than or equal to 1500° C., and the second heat treatment is performed at a temperature of higher than or equal to 400° C. and lower than or equal to 900° C.

In addition, in the above structure, the first heat treatment is performed plural times at different temperatures which are sequentially set higher every time heat treatment is performed.

Further, in the above structure, the carbon-based material is any of glucose, cyclic monosaccharide, straight-chain monosaccharide, and polysaccharide.

According to one embodiment of the present invention, although a silicate-based lithium compound which is a positive electrode active material for a power storage device is manufactured by a solid phase reaction method including heat treatment at a high temperature, microparticulation of the obtained silicate-based lithium compound can be achieved. Further, crystallinity recovery of the microparticulated silicate-based lithium compound can be achieved and further carbon can be supported on the surfaces of particles of the crystallized mixture material. Accordingly, insertion and extraction of lithium into/from a positive electrode active material for a power storage device are facilitated and further electron conductivity can be improved. Therefore, a positive electrode active material for a power storage device which is excellent in capacitance characteristics and electron conductivity can be provided.

DETAILED DESCRIPTION OF THE INVENTION

Figure 1:
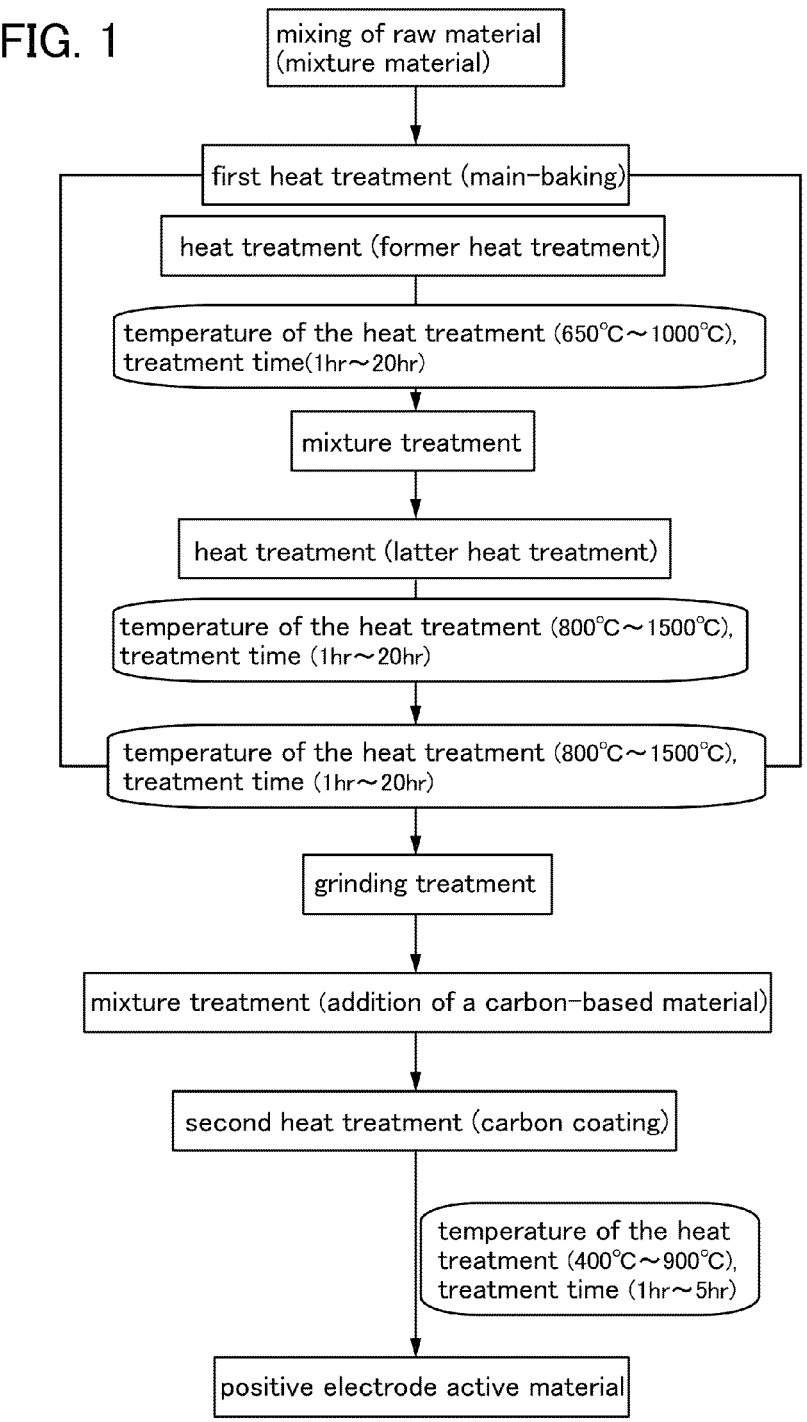
FIG. 1 illustrates one embodiment of a method for manufacturing a positive electrode active material for a power storage device.

Embodiments and an example of the present invention will be described below with reference to the drawings. However, the present invention is not limited to the following description, and the mode and details can be variously changed unless departing from the scope and spirit of the present invention. Thus, the present invention should not be construed as being limited to the description in the following embodiments and example.

Embodiment 1

In this embodiment, an example of a method for manufacturing a positive electrode active material for a power storage device will be described. More specifically, in this embodiment, an example of a method for manufacturing a positive electrode active material for a power storage device, which includes a lithium silicate compound represented by a general formula $Li_2MSiO_4$, by a solid phase reaction method will be described.

In the above general formula, M represents one or more metal elements selected from transition metals such as manganese (Mn), iron (Fe), cobalt (Co), nickel (Ni), and the like.

First, a compound containing lithium which supplies Li in $Li_2MSiO_4$, a compound containing silicon which supplies Si in $Li_2MSiO_4$, and a compound containing a transition metal element which supplies M in $Li_2MSiO_4$ and is selected from transition metals such as manganese, iron, cobalt, and nickel are mixed, so that a mixture material is formed.

As the compound containing lithium, for example, lithium salt such as lithium carbonate ($Li_2CO_3$), lithium oxide ($Li_2O$), or lithium peroxide ($Li_2O_2$) can be used.

Further, as the compound containing silicon, for example, silicon oxide (such as $SiO_2$ or SiO) can be used. And silicon (Si) can be used.

Note that lithium silicate ($Li_2SiO_3$) or the like can be used as a substance which serves as both the compound containing lithium and the compound containing silicon which are described above.

In addition, as the compound containing the transition metal, for example, an oxide such as iron oxide (FeO), manganese oxide (MnO), cobalt oxide (CoO), or nickel oxide (NiO); an oxalate such as iron (II) oxalate dihydrate ($FeC_2O_4.2H_2O$), manganese (II) oxalate dihydrate ($MnC_2O_4.2H_2O$), cobalt (II) oxalate dihydrate ($CoC_2O_4.2H_2O$), or nickel (II) oxalate dihydrate ($NiC_2O_4.2H_2O$); a carbonate such as iron (II) carbonate ($FeCO_3$), manganese (II) carbonate ($MnCO_3$), cobalt (II) carbonate ($CoCO_3$), or nickel (II) carbonate ($NiCO_3$); or the like can be used.

As a method for mixing the above compounds, for example, ball mill treatment can be used. Specifically, a solvent such as acetone that is highly volatile is added to the compounds, and the compounds are mixed by rotation at greater than or equal to 50 rpm and less than or equal to 500 rpm for longer than or equal to 30 minutes and shorter than or equal to 5 hours with the use of metal or ceramic balls (with a diameter $\phi$ of greater than or equal to 1 mm and less than or equal to 10 mm) and a planetary ball mill. With ball mill treatment, the compounds can be mixed and microparticulated at the same time, so that microparticulation of the positive electrode active material for a power storage device, such as a lithium silicate compound, at the time after the formation can be achieved. In addition, with ball mill treatment, the compounds can be uniformly mixed, and crystallinity of the positive electrode active material for a power storage device at the time after the formation can be improved. Note that acetone is given as a solvent, but another solvent in which the raw materials are not dissolved, such as ethanol or methanol, can also be used.

Then, after the obtained mixture material is heated to evaporate the solvent, pressure is applied with a pellet press to form the mixture material into pellets. The pellets are subjected to first heat treatment (main-baking). The first heat treatment may be performed at a temperature of higher than or equal to 800° C. and lower than or equal to 1500° C. (preferably about 900° C.) for longer than or equal to 1 hour and shorter than or equal to 20 hours (preferably about 10 hours). Note that the first heat treatment (main-baking) is performed at a high temperature of higher than or equal to 800° C., whereby the reactivity inside the mixture material can be enhanced and crystallization can be realized in a short time. In addition, although it is preferable to perform heat treatment at a high temperature so that the reactivity of the mixture material is enhanced, when heating is performed rapidly, a by-product which is different from a substance to be produced might be generated, heat treatment may be performed plural times at different temperatures as the first heat treatment in order not to produce the by-product. In other words, as illustrated in a scheme of FIG. 1, heat treatment at a high temperature (latter heat treatment) may be performed after heat treatment at a low temperature (former heat treatment) is performed first.

Note that the first heat treatment is preferably performed under a hydrogen atmosphere, or an atmosphere of an inert gas such as a rare gas (such as helium, neon, argon, or xenon) or nitrogen.

In the case where heat treatment is performed twice as the first heat treatment (main-baking) as illustrated in FIG. 1, the former heat treatment may be performed at a temperature of higher than or equal to 650° C. and lower than or equal to 1000° C. (preferably about 900° C.) for longer than or equal to 1 hour and shorter than or equal to 20 hours (preferably about 10 hours).

After the former heat treatment is performed, the mixture material, to which a solvent such as acetone is added, is subjected to mixture treatment. Note that a mortar, the above ball mill, or the like can be used for the mixture treatment. In the case where the mixture treatment is performed using a planetary ball mill, ball mill treatment is performed under the following condition: a ball whose diameter $\phi$ is greater than or equal to 1 mm and less than or equal to 10 mm is used and rotation is performed at greater than or equal to 300 rpm and less than or equal to 500 rpm (preferably about 400 rpm) for longer than or equal to 30 minutes and shorter than or equal to 3 hours.

Then, after the mixture material is heated to evaporate the solvent, pressure is applied with a pellet press to form the mixture material into pellets. The pellets are subjected to the latter heat treatment of the first heat treatment (main-baking).

The latter heat treatment of the first heat treatment (main-baking) may be performed at a temperature of higher than or equal to 800° C. and lower than or equal to 1500° C. (preferably about 1000° C.) for longer than or equal to 1 hour and shorter than or equal to 20 hours (preferably about 10 hours). The temperature of the latter heat treatment is preferably higher than the temperature of the above former heat treatment.

Next, the mixture material which has been subjected to the first heat treatment (main-baking), to which a solvent such as acetone is added, is subjected to grinding treatment. Note that as a method of the grinding treatment, grinding using the above planetary ball mill is preferable. At this time, ball mill treatment is performed under the following condition: a ball whose diameter φ is greater than or equal to 1 mm and less than or equal to 10 mm is used and rotation is performed at greater than or equal to 300 rpm and less than or equal to 500 rpm (preferably about 400 rpm) for longer than or equal to 10 hours and shorter than or equal to 60 hours (preferably about 20 hours).

Next, the mixture material subjected to the grinding treatment, to which an organic compound such as glucose is added as a carbon-based material and further a solvent such as acetone is added, is subjected to mixture treatment. Note that the mixture treatment here is performed using the above planetary ball mill. At this time, ball mill treatment is performed under the following condition: a ball whose diameter φ is greater than or equal to 1 mm and less than or equal to 10 mm is used and rotation is performed at greater than or equal to 300 rpm and less than or equal to 500 rpm (preferably about 400 rpm) for longer than or equal to 30 minutes and shorter than or equal to 3 hours (preferably about 2 hours).

Then, second heat treatment is performed. Note that the second heat treatment may be performed under the following condition: the heat treatment is performed at a temperature of higher than or equal to 400° C. and lower than or equal to 900° C. (preferably about 600° C.) for longer than or equal to 1 hour and shorter than or equal to 5 hours (preferably about 3 hours).

Note that the second heat treatment is preferably performed under a hydrogen atmosphere, or an atmosphere of an inert gas such as a rare gas (such as helium, neon, argon, or xenon) or nitrogen.

By performing the second heat treatment, the crystallinity of the mixture material which is generated through the above grinding treatment is recovered and further carbon contained in the carbon-based material which is added in the mixture treatment can be supported on the surfaces of particles of the mixture material. Note that in this specification, the state in which carbon is supported on the surfaces of particles of a lithium silicate compound is also described that particles of the lithium silicate compound is coated with carbon.

Note that lithium is easily diffused and thus electron conductivity can be improved by recovering the crystallinity of the mixture material. By supporting carbon on the surfaces of particles of the lithium silicate compound, the conductivity of the surfaces of the particles of the lithium silicate compound can be increased. In addition, when the particles of the lithium silicate compound are in contact with each other through carbon supported on the surfaces, the particles of the lithium silicate compound become electrically conductive with each other; thus, the conductivity between the particles of the lithium silicate compound can be increased. The thickness of the carbon (a carbon layer) supported on the surfaces is preferably greater than 0 nm and less than or equal to 100 nm, more preferably greater than or equal to 5 nm and less than or equal to 10 nm.

Note that glucose easily reacts with a silicate group and therefore is suitable as a supply source of carbon. Further, cyclic monosaccharide, straight-chain monosaccharide, or polysaccharide which reacts well with a silicate group may be used instead of glucose.

Through the above process, the lithium silicate compound that can be used as the positive electrode active material for a power storage device can be manufactured.

Note that as for the positive electrode active material for a power storage device, which is obtained in the manufacturing method described in this embodiment, heat treatment is performed at a high temperature on a mixture material, grinding treatment is performed, a carbon-based material is added, and then heat treatment is performed again. Therefore, the reactivity between the substances contained in the mixture material is enhanced, favorable crystallinity can be obtained, and further microparticulation of the grain size of crystal which is grown larger by the high temperature treatment and crystallinity recovery are achieved; and at the same time, carbon can be supported on the surfaces of particles of the crystallized mixture material. Accordingly, insertion and extraction of lithium into/from the obtained positive electrode active material for a power storage device are facilitated and further electron conductivity can be improved. Thus, in a power storage device formed using this positive electrode active material for a power storage device, the discharging capacity can be improved, and the charging and discharging rate, that is, the rate characteristics can be improved.

As described above, the structures, methods, and the like described in this embodiment can be combined with any of the structures, methods, and the like described in the other embodiments as appropriate.

Embodiment 2

In this embodiment, a lithium-ion secondary battery will be described as one embodiment of a power storage device in which a positive electrode active material for a power storage device, which is obtained through the manufacturing process in Embodiment 1, is used. The schematic structure of the lithium-ion secondary battery is illustrated in FIG. 2.

Figure 2:
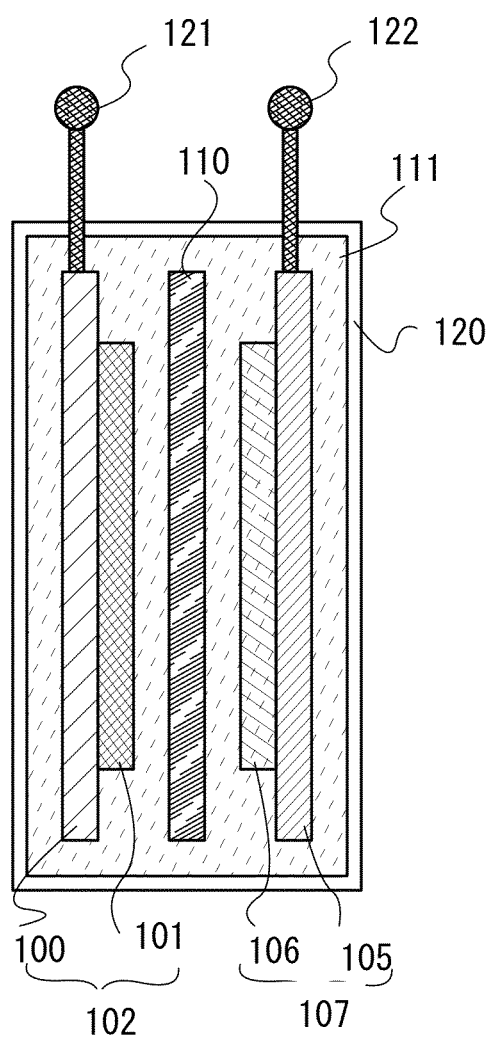
FIG. 2 illustrates one embodiment of a power storage device.

In the lithium-ion secondary battery illustrated in FIG. 2, a positive electrode 102, a negative electrode 107, and a separator 110 are provided in a housing 120 which isolates the components from the outside, and the housing 120 is filled with an electrolyte solution 111. The separator 110 is provided between the positive electrode 102 and the negative electrode 107. Note that in this specification, a positive electrode active material layer 101 and a positive electrode current collector 100 over which the positive electrode active material layer 101 is formed are collectively referred to as the positive electrode 102. In addition, a negative electrode active material layer 106 and a negative electrode current collector 105 over which the negative electrode active material layer 106 is formed are collectively referred to as the negative electrode 107. A first electrode 121 and a second electrode 122 are connected to the positive electrode current collector 100 and the negative electrode current collector 105, respectively, and charging and discharging are performed by the first electrode 121 and the second electrode 122. Further, there are certain gaps between the positive electrode active material layer 101 and the separator 110 and between the negative electrode active material layer 106 and the separator 110. However, the structure is not limited thereto; the positive electrode active material layer 101 may be in contact with the separator 110, and the negative electrode active material layer 106 may be in contact with the separator 110. In addition, the lithium-ion secondary battery may be rolled into a cylinder shape, with the separator 110 provided between the positive electrode 102 and the negative electrode 107.

The positive electrode active material layer 101 is formed over the positive electrode current collector 100. The positive electrode active material layer 101 includes a positive electrode active material and, in this embodiment, includes the positive electrode active material for a power storage device, which is manufactured in Embodiment 1, as the positive electrode active material. Meanwhile, the negative electrode active material layer 106 is formed over the negative electrode current collector 105.

As the positive electrode current collector 100, a material having high conductivity such as aluminum or stainless steel can be used. The positive electrode current collector 100 can have a foil shape, a plate shape, a net shape, or the like as appropriate.

The positive electrode active material layer 101 includes a positive electrode active material, a conduction auxiliary agent, a binder, and the like.

Note that as the positive electrode active material, the lithium silicate compound described in Embodiment 1 is used. In other words, after the second heat treatment (carbon coating) described in Embodiment 1, the paste of the obtained lithium silicate compound is obtained in such a manner that the lithium silicate compound is ground again with a ball mill to obtain fine powder and a conduction auxiliary agent, a binder, and a solvent are added to the fine powder.

Further, as the conduction auxiliary agent, a material which is itself an electron conductor and does not cause chemical reaction with other materials in a battery device may be used. For example, carbon-based materials such as graphite, carbon fiber, carbon black, acetylene black, and VGCF (registered trademark); metal materials such as copper, nickel, aluminum, and silver; and powder, fiber, and the like of mixtures thereof can be given. The conduction auxiliary agent is a material that assists conduction between active materials; it is provided between active materials which are apart and makes conduction between the active materials.

As the binder, polysaccharides such as starch, carboxymethyl cellulose, hydroxypropyl cellulose, regenerated cellulose, and diacetyl cellulose; vinyl polymers such as polyvinylchloride, polyethylene, polypropylene, polyvinyl alcohol, polyvinyl pyrrolidone, polytetrafluoroethylene, polyvinyliden fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

In the positive electrode active material layer 101, the positive electrode active material (the lithium silicate compound described in Embodiment 1), the conduction auxiliary agent, and the binder are mixed at 80 wt % to 96 wt %, 2 wt % to 10 wt %, and 2 wt % to 10 wt %, respectively, to be 100 wt % in total. Further, an organic solvent, the volume of which is substantially the same as that of a mixture of the positive electrode active material, the conduction auxiliary agent, and the binder, is mixed to the mixture, and this mixture is processed into a slurry state. Note that an object which is obtained by processing, into a slurry state, a mixture of the positive electrode active material, the conduction auxiliary agent, the binder, and the organic solvent is referred to as slurry. As the solvent, N-methyl-2-pyrrolidone, lactic acid ester, or the like can be used. The proportions of the positive electrode active material, the conduction auxiliary agent, and the binder are preferably adjusted as appropriate in such a manner that, for example, when the positive electrode active material and the conduction auxiliary agent have low adhesiveness at the time of film formation, the amount of binder is increased, and when the resistance of the positive electrode active material is high, the amount of the conduction auxiliary agent is increased.

Here, an aluminum foil is used as the positive electrode current collector 100. The slurry is dripped thereon and is thinly spread by a casting method. Then, after the slurry is further stretched by a roller press machine and the thickness is made uniform, vacuum drying (under a pressure of less than or equal to 10 Pa) or heat drying (at a temperature of 90° C. to 280° C.) is performed, so that the positive electrode active material layer 101 is formed over the positive electrode current collector 100. As the thickness of the positive electrode active material layer 101, a desired thickness is selected from the range of 20 μm to 100 μm. It is preferable to adjust the thickness of the positive electrode active material layer 101 as appropriate so that cracks and separation do not occur. Further, it is preferable that cracks and separation be made not to occur in the positive electrode active material layer 101 not only when the lithium-ion secondary battery is flat but also rolled into a cylinder shape, though it depends on forms of the lithium-ion secondary battery.

As the negative electrode current collector 105, a material having high conductivity such as copper, stainless steel, iron, or nickel can be used.

As the negative electrode active material layer 106, lithium, aluminum, graphite, silicon, germanium, or the like is used. The negative electrode active material layer 106 may be formed over the negative electrode current collector 105 by a coating method, a sputtering method, an evaporation method, or the like. Each material may be used alone as the negative electrode active material layer 106. The theoretical lithium occlusion capacity is larger in germanium, silicon, lithium, and aluminum than in graphite. When the occlusion capacity is large, charging and discharging can be performed sufficiently even in a small area and a function as a negative electrode can be obtained; therefore, cost reduction and miniaturization of the secondary battery can be realized. However, in the case of silicon or the like, the volume is increased approximately four times the volume before lithium occlusion; therefore, it is necessary to pay attention to the risk of explosion, the probability that the material itself gets vulnerable, and the like.

As the electrolyte, an electrolyte solution that is an electrolyte in a liquid state or a solid electrolyte that is an electrolyte in a solid state may be used. The electrolyte solution contains an alkali metal ion or an alkaline earth metal ion as a carrier ion, and this carrier ion is responsible for electron conduction. Examples of the alkali metal ion include a lithium ion, a sodium ion, and a potassium ion. Examples of the alkaline earth metal ion include a calcium ion, a strontium ion, and a barium ion. In addition, a beryllium ion and a magnesium ion can be used.

The electrolyte solution 111 includes, for example, a solvent and a solute (a lithium salt or a sodium salt) dissolved in the solvent. Examples of the lithium salt include lithium chloride (LiCl), lithium fluoride (LiF), lithium perchlorate ($LiClO_4$), lithium tetrafluoroborate ($LiBF_4$), $LiAsF_6$, $LiPF_6$, and $Li(C_2F_5SO_2)_2N$. Examples of the sodium salt include sodium chloride (NaCl), sodium fluoride (NaF), sodium perchlorate ($NaClO_4$), and sodium fluoroborate ($NaBF_4$).

Examples of the solvent for the electrolyte solution 111 include cyclic carbonates (e.g., ethylene carbonate (hereinafter abbreviated to EC), propylene carbonate (PC), butylene carbonate (BC), and vinylene carbonate (VC)); acyclic carbonates (e.g., dimethyl carbonate (DMC), diethyl carbonate (DEC), ethylmethyl carbonate (EMC), methylpropyl carbonate (MPC), isobutyl methyl carbonate, and dipropyl carbonate (DPC)); aliphatic carboxylic acid esters (e.g., methyl formate, methyl acetate, methyl propionate, and ethyl propionate); acyclic ethers (e.g., γ-lactones such as γ-butyrolactone, 1,2-dimethoxyethane (DME), 1,2-diethoxyethane (DEE), and ethoxymethoxy ethane (EME)); cyclic ethers (e.g., tetrahydrofuran and 2-methyltetrahydrofuran); cyclic sulfones (e.g., sulfolane); alkyl phosphate ester (e.g., dimethylsulfoxide, 1,3-dioxolane, trimethyl phosphate, triethyl phosphate, and trioctyl phosphate); and fluorides thereof. All of the above solvents can be used either alone or in combination for the electrolyte solution 111.

As the separator 110, paper; nonwoven fabric; glass fiber; synthetic fiber such as nylon (polyamide), vinylon (polyvinyl alcohol-based fiber that is also called vinalon), polypropylene (PP), polyester, acrylic, polyolefin, or polyurethane; or the like may be used. Note that a material which is not dissolved in the electrolyte solution 111 described above should be selected.

Specific examples of the material for the separator 110 are high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane; derivatives thereof; cellulose; paper; and nonwoven fabric, all of which can be used either alone or in combination.

When charging of the lithium-ion secondary battery described above is performed, a positive electrode terminal is connected to the first electrode 121 and a negative electrode terminal is connected to the second electrode 122. An electron is taken away from the positive electrode 102 through the first electrode 121 and transferred to the negative electrode 107 through the second electrode 122. In addition, a lithium ion is eluted from the active material in the positive electrode active material layer 101 of the positive electrode, reaches the negative electrode 107 through the separator 110, and is taken into the active material in the negative electrode active material layer 106. The lithium ion and the electron are aggregated in this region and are occluded in the negative electrode active material layer 106. At the same time, in the positive electrode active material layer 101, an electron is released from the active material, and oxidation reaction of the metal M contained in the active material is caused.

At the time of discharging, in the negative electrode 107, the negative electrode active material layer 106 releases lithium as an ion, and an electron is transferred to the second electrode 122. The lithium ion passes through the separator 110, reaches the positive electrode active material layer 101, and is taken into the active material in the positive electrode active material layer 101. At that time, the electron from the negative electrode 107 also reaches the positive electrode 102, and reduction reaction of the metal M is caused.

In the lithium-ion secondary battery manufactured as described above, the lithium silicate compound which is obtained through the manufacturing process described in Embodiment 1 is used as the positive electrode active material. Note that in the case of the lithium silicate compound which is obtained through the manufacturing process described in Embodiment 1, microparticulation of the grain size of crystal which is grown larger by the high temperature treatment and crystallinity recovery are achieved; and at the same time, carbon can be supported on the surfaces of particles of the crystallized mixture material. Accordingly, insertion and extraction of lithium into/from the obtained positive electrode active material are facilitated and further electron conductivity can be improved. Therefore, the lithium-ion secondary battery in which the discharging capacity is large and the charging and discharging rate is high can be obtained.

As described above, the structures, methods, and the like described in this embodiment can be combined with any of the structures, methods, and the like described in the other embodiments as appropriate.

Embodiment 3

In this embodiment, application of a power storage device according to one embodiment of the present invention will be described.

The power storage device can be provided in a variety of electronic devices.

For example, the power storage device can be provided in cameras such as digital cameras or video cameras, mobile phones, portable information terminals, e-book terminals, portable game machines, digital photo frames, audio reproducing devices, and the like. Moreover, the power storage device can be provided in electrically propelled vehicles such as electric vehicles, hybrid vehicles, electric railway cars, working vehicles, carts, wheelchairs, and bicycles.

The characteristics of the power storage device according to one embodiment of the present invention are improved; for example, higher capacitance and a higher charging and discharging rate are obtained. By improving the characteristics of the power storage device, the power storage device can also be compact and lightweight. When being provided with such a power storage device, electronic devices, electrically propelled vehicles, or the like can have a shorter charging time, a longer operating time, and reduced size and weight, and thus their convenience and design can be improved.

Figure 3A:
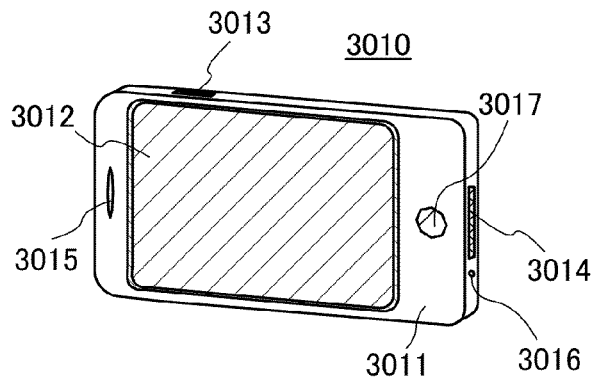
FIGS. 3A and 3B each show an application example of a power storage device.

FIG. 3A shows an example of a mobile phone. In a mobile phone 3010, a display portion 3012 is incorporated in a housing 3011. The housing 3011 is provided with an operation button 3013, an operation button 3017, an external connection port 3014, a speaker 3015, a microphone 3016, and the like. When the power storage device according to one embodiment of the present invention is provided in such a mobile phone, the mobile phone can have improved convenience and design.

Figure 3B:
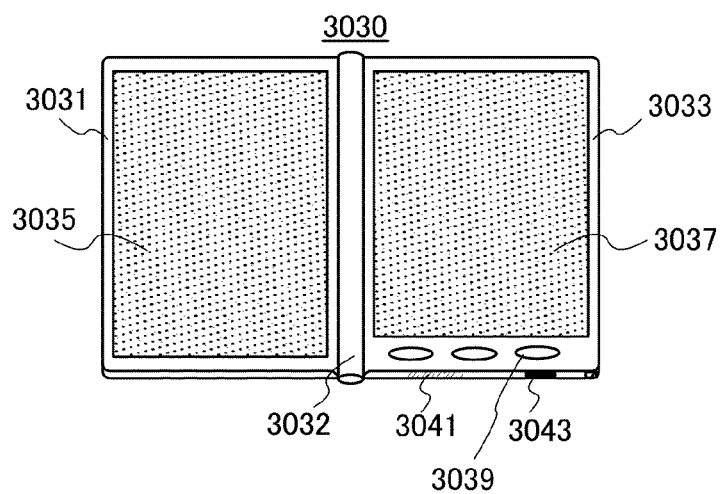

FIG. 3B shows an example of an e-book terminal An e-book terminal 3030 includes two housings, a first housing 3031 and a second housing 3033, which are combined with each other with a hinge 3032. The first and second housings 3031 and 3033 can be opened and closed with the hinge 3032 as an axis. A first display portion 3035 and a second display portion 3037 are incorporated in the first housing 3031 and the second housing 3033, respectively. In addition, the second housing 3033 is provided with an operation button 3039, a power switch 3043, a speaker 3041, and the like. When the power storage device according to one embodiment of the present invention is provided in such an e-book terminal, the e-book terminal can have improved convenience and design.

Figure 4:
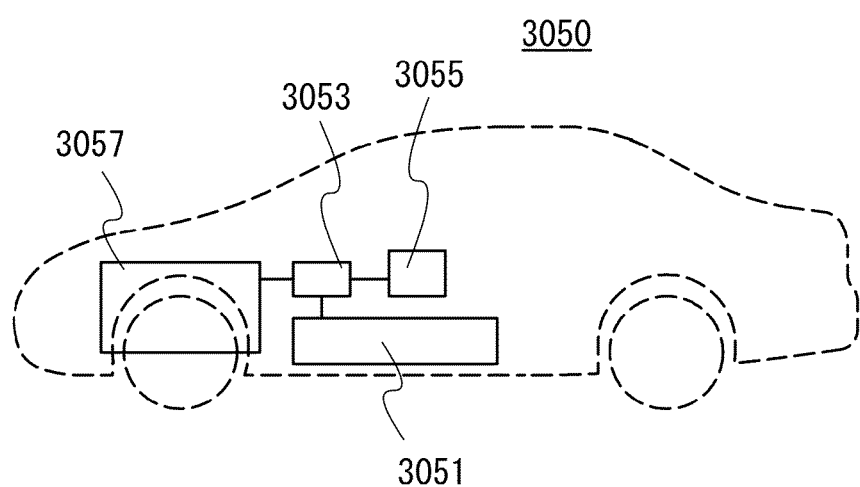
FIG. 4 shows an application example of a power storage device.

FIG. 4 shows an example of an electric vehicle. A power storage device 3051 is provided in an electric vehicle 3050. The power of the power storage device 3051 is controlled by a control circuit 3053 to be output and is supplied to a driving device 3057. The control circuit 3053 is controlled by a computer 3055.

The driving device 3057 includes a DC motor or an AC motor either alone or in combination with an internal-combustion engine. The computer 3055 outputs a control signal to the control circuit 3053 on the basis of input data such as data of operation (e.g., acceleration, deceleration, or stop) by a driver or data during driving (e.g., data on ascending or descending a slope, or data on a load on a driving wheel) of the electric vehicle 3050. The control circuit 3053 adjusts electric energy supplied from the power storage device 3051 in accordance with the control signal of the computer 3055 to control the output of the driving device 3057. In the case where the AC motor is mounted, an inverter which converts direct current into alternate current is incorporated.

Charging of the power storage device 3051 can be performed by supplying power from the external by a plug-in technique. When the power storage device according to one embodiment of the present invention is provided as the power storage device 3051, a shorter charging time and improved convenience can be realized. Besides, the higher charging and discharging rate of the power storage device can contribute to greater acceleration and excellent performance of the electric vehicle. Further, when the power storage device 3051 can be reduced in size and weight as a result of improvement in its characteristics, the vehicle can be reduced in weight and the fuel-efficiency can be improved.

Note that in the case where the power storage device is provided in electric railway cars as electrically propelled vehicles, charging of the power storage device can be performed by supplying power from overhead wires or conductive rails.

As described above, the structures, methods, and the like described in this embodiment can be combined with any of the structures, methods, and the like described in the other embodiments as appropriate.

EXAMPLE

In this example, an example will be described in which lithium manganese silicate ($LiMnSiO_4$) which is a positive electrode active material for a power storage device was manufactured by using the manufacturing method according to one embodiment of the present invention.

Lithium silicate ($LiSiO_2$) and manganese (II) oxalate ($MnC_2O_4$) were used as raw materials of lithium manganese silicate, acetone was added as a solvent, and mixture treatment was performed with a ball mill. The mixture treatment with a ball mill with a ceramic ball (with a diameter $\phi$ of 3 mm) was rotated at 400 rpm for 2 hours.

Next, the mixture material which was obtained by the mixture treatment was shaped into pellets by applying a pressure of 150 kgf/cm² with a pellet press machine for 5 minutes.

Then, pellets of the mixture material were put in an alumina crucible and subjected to former heat treatment of first heat treatment (main-baking) at 900° C. in a nitrogen atmosphere for 10 hours.

After the former heat treatment, acetone was added to the baked mixture material and was mixed and then the mixture material was shaped into pellets by applying a pressure of 150 kgf/cm² with a pellet press machine for 5 minutes again.

Then, pellets of the mixture material were put in an alumina crucible and subjected to latter heat treatment of the first heat treatment (main-baking) at 1000° C. in a nitrogen atmosphere for 10 hours.

Then, grinding treatment was performed with a ball mill. In the grinding treatment, acetone was added as a solvent and the grinding treatment with a ceramic ball (with a diameter $\phi$ of 3 mm) was performed rotated at 400 rpm for 20 hours.

Next, the mixture material subjected to the grinding treatment, to which glucose was added as a carbon-based material and further acetone was added as a solvent, was subjected to mixture treatment with a ball mill. Note that here 10 wt % of glucose was added and the mixture treatment with a ceramic ball (with a diameter $\phi$ of 3 mm) was performed at 400 rpm for 2 hours to perform the mixture treatment.

After the mixture treatment, the mixture material was put in an alumina crucible and subjected to second heat treatment at 600° C. in a nitrogen atmosphere for 10 hours. Accordingly, the surface of the mixture material can be coated with carbon (carbon coating).

Through the above method, the lithium manganese silicate ($LiMnSiO_4$) which was a positive electrode active material for a power storage device was manufactured in this example.

Figure 5A:
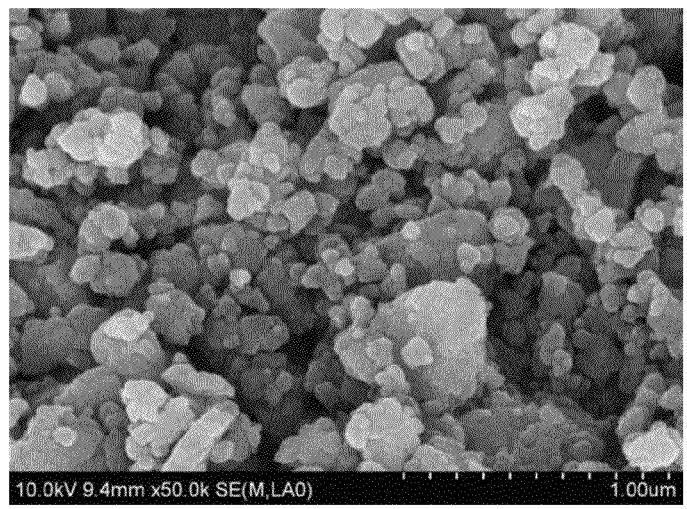
FIGS. 5A and 5B are photographs each showing the characteristics of a positive electrode active material for a power storage device formed in Example.
Figure 5B:
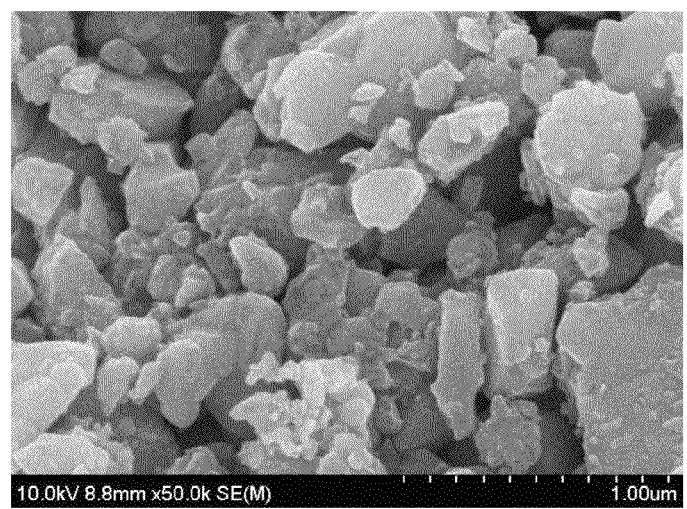

FIG. 5A shows a SEM photograph of the lithium manganese silicate ($LiMnSiO_4$) which was obtained in this example. Note that FIG. 5B shows a SEM photograph of lithium manganese silicate which was manufactured and obtained without performing grinding treatment after the first heat treatment (main-baking) in this example. Accordingly, it is found that the particle size of the lithium manganese silicate subjected to the grinding treatment, which is shown in FIG. 5A, is smaller than that of the lithium manganese silicate manufactured without performing grinding treatment, which is shown in FIG. 5B.

In addition, a lithium-ion secondary battery was manufactured using the lithium manganese silicate ($LiMnSiO_4$) which was obtained in this example and the discharging capacity was measured.

A positive electrode of the lithium-ion secondary battery was manufactured here by mixing a conduction auxiliary agent and a binder into a positive electrode active material for a power storage device, which was manufactured in this example, the lithium manganese silicate. Acetylene black was used as the conduction auxiliary agent and polytetrafluoroethylene (PTFE) was used as the binder, and the mixture ratio ($LiMnPO_4$:acetylene black:PTFT) in weight (wt %) was set to 80:15:5. The mixture material was formed into a pellet-shaped electrode by pressure extension with a roll press machine. After that, a positive electrode current collector formed of aluminum was pressure-bonded to the electrode, whereby a positive electrode of a lithium-ion secondary battery was manufactured.

In addition, a lithium foil was used as a negative electrode and polypropylene (PP) was used as a separator in the lithium-ion secondary battery. In addition, an electrolyte solution in which a solute was lithium hexafluorophosphate ($LiPF_6$) and a solution was ethylene carbonate (EC) and dimethyl carbonate (DMC) was used. Note that the separator was impregnated with the electrolyte solution.

Through the above process, a coin-shaped lithium-ion secondary battery including the positive electrode, the negative electrode, the separator, and the electrolyte solution was obtained. Assembly of the positive electrode, the negative electrode, the separator, the electrolyte solution, and the like was performed in a glove box in an argon atmosphere.

Figure 6A:
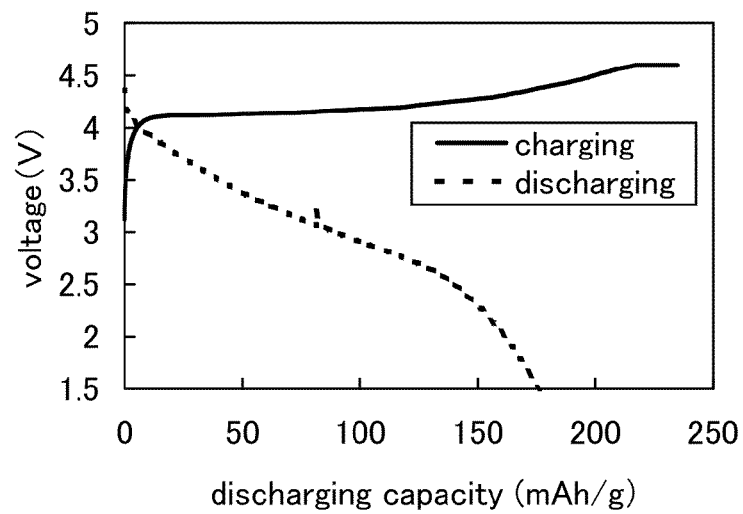
FIGS. 6A and 6B each show the characteristics of a positive electrode active material for a power storage device formed in Example.
Figure 6B:
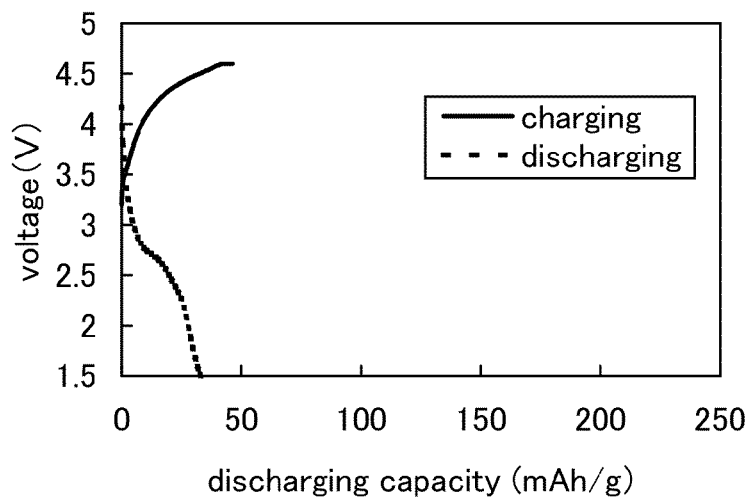

FIG. 6A shows the discharging capacity of the obtained lithium-ion secondary battery. In addition, FIG. 6B shows the discharging capacity of a lithium-ion secondary battery manufactured using the lithium manganese silicate which was manufactured and obtained without performing grinding treatment after the first heat treatment (main-baking) in this example. Note that in FIGS. 6A and 6B, the horizontal axis indicates discharging capacity (mAh/g) per unit mass, and the vertical axis indicates voltage (V).

By comparison between FIGS. 6A and 6B, it was confirmed that the discharging capacity of the lithium-ion secondary battery was improved in the case where the lithium manganese silicate manufactured in this example is used as a positive electrode active material, that is, in the case where the lithium manganese silicate manufactured by performing the grinding treatment after the first heat treatment (main-baking) is used as a positive electrode active material. The reason of that is as follows. The heat treatment was performed at a high temperature on the mixture material, the grinding treatment was performed, and then the heat treatment was performed again. Therefore, the reactivity between the substances contained in the mixture material was enhanced, favorable crystallinity was able to be obtained, and further microparticulation of the grain size of crystal which was grown larger by the high temperature treatment and crystallinity recovery were achieved; and in addition, carbon was able to be supported on the surfaces of particles of the crystallized mixture material. Accordingly, insertion and extraction of lithium into/from the obtained positive electrode active material were facilitated and further electron conductivity was improved.

As described above, in manufacturing lithium manganese silicate (LiMnSiO$_4$), heat treatment is performed on raw materials at a high temperature, grinding treatment is performed, and then heat treatment is performed again, whereby microparticulated lithium manganese silicate (LiMnSiO$_4$) having favorable crystallinity can be obtained; thus, a positive electrode active material for a power storage device, in which electron conductivity is improved, can be manufactured. In addition, when a lithium-ion secondary battery is formed using the positive electrode active material for a power storage device, a lithium-ion secondary battery with large discharging capacity can be obtained.

This application is based on Japanese Patent Application serial No. 2010-232203 filed with the Japan Patent Office on Oct. 15, 2010, the entire contents of which are hereby incorporated by reference.

What is claimed is:

1. A method for manufacturing a positive electrode active material for a power storage device, comprising the steps of:
performing first heat treatment on a first mixture material in which a compound containing lithium, a compound containing a transition metal, and a compound containing silicon are mixed to obtain first particles;
performing first mixing treatment on the first particles to obtain second particles after the first heat treatment;
performing second heat treatment on the second particles at a temperature higher than a temperature of the first heat treatment to obtain third particles;
performing grinding treatment on the third particles to obtain fourth particles after the second heat treatment;
adding a carbon-based material to the fourth particles and performing second mixing treatment to obtain a second mixture; and
performing third heat treatment on the second mixture at a temperature lower than a temperature of the second heat treatment to obtain fifth particles,
wherein the grinding treatment is performed by a planetary ball mill after adding a solvent to the second particles,
wherein the grinding treatment is performed for longer time than the first mixing treatment,
wherein an average primary particle size of the fifth particles is smaller than that of the third particles, and
wherein each of the first particles, the second particles, the third particles, the fourth particles, and the fifth particles comprises lithium metal silicate.

2. The method for manufacturing a positive electrode active material for a power storage device, according to claim 1, wherein the transition metal is selected from the group consisting of manganese, iron, cobalt, and nickel.

3. The method for manufacturing a positive electrode active material for a power storage device, according to claim 1,
wherein the first heat treatment is performed at a temperature of higher than or equal to 650° C. and lower than or equal to 1000° C.,
wherein the second heat treatment is performed at a temperature of higher than or equal to 800° C. and lower than or equal to 1500° C., and
wherein the third heat treatment is performed at a temperature of higher than or equal to 400° C. and lower than or equal to 900° C.

4. The method for manufacturing a positive electrode active material for a power storage device, according to claim 1, wherein the carbon-based material is selected from the group consisting of glucose, cyclic monosaccharide, straight-chain monosaccharide, and polysaccharide.

5. The method for manufacturing a positive electrode active material for a power storage device, according to claim 1, wherein a thickness of a carbon layer supported on a surface of each of the third particles is less than or equal to 100 nm.

6. The method for manufacturing a positive electrode active material for a power storage device, according to claim 1, wherein each of the average primary particle size of the first particles and that of the third particles is measured with a SEM.

7. The method for manufacturing a positive electrode active material for a power storage device, according to claim 1,
wherein the third particles have a first crystallinity,
wherein the fourth particles have a second crystallinity,
wherein the fifth particles have a third crystallinity,
wherein the second crystallinity is lower than the first crystallinity, and
wherein the second crystallinity is lower than the third crystallinity.

8. The method for manufacturing a positive electrode active material for a power storage device, according to claim 1, wherein the first mixing treatment is performed by a planetary ball mill.

9. The method for manufacturing a positive electrode active material for a power storage device, according to claim 8,
wherein the first mixing treatment is performed for 30 minutes and shorter than or equal to 5 hours, and
wherein the grinding treatment is performed for longer than or equal to 10 hours and shorter than or equal to 60 hours.

10. The method for manufacturing a positive electrode active material for a power storage device, according to claim 1,
wherein the fifth particles comprise lithium metal silicate represented by Formula Li$_2$MSiO$_4$, and
wherein M is selected from the group consisting of manganese, iron, cobalt, and nickel.

11. A method for manufacturing a positive electrode active material for a power storage device, comprising the steps of:
performing first heat treatment on a mixture material in which a compound containing lithium, a compound containing a transition metal, and a compound containing silicon are mixed to obtain first particles;
performing mixing treatment on the first particles to obtain second particles after the first heat treatment;
performing second heat treatment on the second particles at a temperature higher than a temperature of the first heat treatment to obtain third particles;
performing grinding treatment on the third particles to obtain fourth particles after the first heat treatment; and
performing third heat treatment at a temperature lower than a temperature of the first heat treatment on the fourth particles to obtain fifth particles,
wherein the grinding treatment is performed by a planetary ball mill after adding a solvent to the third particles,
wherein the grinding treatment is performed for longer time than the mixing treatment,
wherein an average primary particle size of the fifth particles is smaller than that of the third particles, and
wherein each of the first particles, the second particles, and the third particles comprises lithium metal silicate.

12. The method for manufacturing a positive electrode active material for a power storage device, according to claim 11, wherein the transition metal is selected from the group consisting of manganese, iron, cobalt, and nickel.

13. The method for manufacturing a positive electrode active material for a power storage device, according to claim 11,
wherein the first heat treatment is performed at a temperature of higher than or equal to 650° C. and lower than or equal to 1000° C.,
wherein the second heat treatment is performed at a temperature of higher than or equal to 800° C. and lower than or equal to 1500° C., and
wherein the second third heat treatment is performed at a temperature of higher than or equal to 400° C. and lower than or equal to 900° C.

14. The method for manufacturing a positive electrode active material for a power storage device, according to claim 11, wherein a thickness of a carbon layer supported on a surface of the positive electrode active material is less than or equal to 100 nm.

15. The method for manufacturing a positive electrode active material for a power storage device, according to claim 11, wherein each of the average primary particle size of the first particles and that of the third particles is measured with a SEM.

16. The method for manufacturing a positive electrode active material for a power storage device, according to claim 11,
wherein the third particles have a first crystallinity,
wherein the fourth particles have a second crystallinity,
wherein the fifth particles have a third crystallinity,
wherein the second crystallinity is lower than the first crystallinity, and
wherein the second crystallinity is lower than the third crystallinity.

17. The method for manufacturing a positive electrode active material for a power storage device, according to claim 11, wherein the mixing treatment to obtain the second particles is performed by a planetary ball mill.

18. The method for manufacturing a positive electrode active material for a power storage device, according to claim 17,
wherein the mixing treatment to obtain the second particles is performed for 30 minutes and shorter than or equal to 5 hours, and
wherein the grinding treatment is performed for longer than or equal to 10 hours and shorter than or equal to 60 hours.

19. The method for manufacturing a positive electrode active material for a power storage device, according to claim 11,
wherein the fifth particles comprise lithium metal silicate represented by Formula $Li_2MSiO_4$, and
wherein M is selected from the group consisting of manganese, iron, cobalt, and nickel.

* * * * *

UNITED STATES PATENT AND TRADEMARK OFFICE
CERTIFICATE OF CORRECTION

| | | |
|---|---|---|
| PATENT NO. | : 8,992,795 B2 | Page 1 of 1 |
| APPLICATION NO. | : 13/273262 | |
| DATED | : March 31, 2015 | |
| INVENTOR(S) | : Masaki Yamakaji et al. | |

It is certified that error appears in the above-identified patent and that said Letters Patent is hereby corrected as shown below:

In the Specification:

Col. 3, line 45, "$FeC_2O_4.2H_2O$" should read --$FeC_2O_4 \cdot 2H_2O$--

Col. 3, line 46, "$MnC_2O_4.2H_2O$" should read --$MnC_2O_4 \cdot 2H_2O$--

Col. 3, line 47, "$CoC_2O_4.2H_2O$" should read --$CoC_2O_4 \cdot 2H_2O$--

Col. 3, line 48, "$NiC_2O_4.2H_2O$" should read --$NiC_2O_4 \cdot 2H_2O$--

Col. 10, line 30, "terminal" should read --terminal.--

In the Claims:

Claim 13, Col. 15, line 12, "second third" should read --third--

Signed and Sealed this
Sixth Day of October, 2015

Michelle K. Lee
*Director of the United States Patent and Trademark Office*